MEANS FOR FEEDING RECORD CARDS FOR USE IN STATISTICAL, ACCOUNTANCY AND OTHER MACHINES

Filed July 13, 1956

4 Sheets-Sheet 1

INVENTOR
JAMES LAST
BY
Wenderoth, Lind + Ponack
ATTORNEYS

April 7, 1959 J. LAST 2,880,994

MEANS FOR FEEDING RECORD CARDS FOR USE IN STATISTICAL, ACCOUNTANCY AND OTHER MACHINES

Filed July 13, 1956 4 Sheets-Sheet 2

INVENTOR

JAMES LAST

BY

Wenderoth, Lind & Ponack

ATTORNEYS

April 7, 1959 J. LAST 2,880,994

MEANS FOR FEEDING RECORD CARDS FOR USE IN STATISTICAL, ACCOUNTANCY AND OTHER MACHINES

Filed July 13, 1956 4 Sheets-Sheet 3

INVENTOR

JAMES LAST

BY

Wenderoth, Lind & Ponack

ATTORNEYS

April 7, 1959 J. LAST 2,880,994

MEANS FOR FEEDING RECORD CARDS FOR USE IN STATISTICAL, ACCOUNTANCY AND OTHER MACHINES

Filed July 13, 1956 4 Sheets-Sheet 4

INVENTOR
JAMES LAST
BY
Wenderoth, Lind & Ponack
ATTORNEYS 2,880,994

MEANS FOR FEEDING RECORD CARDS FOR USE IN STATISTICAL, ACCOUNTANCY AND OTHER MACHINES

James Last, St. Albans, England, assignor to Elliott Brothers (London) Limited, Borehamwood, England, a British company Application July 13, 1956, Serial No. 597,816

Claims priority, application Great Britain July 22, 1955

7 Claims. (Cl. 271—10)

This invention relates to the feeding of record cards of rectangular shape for use in statistical, accountancy and other machines. Such cards usually bear index points which are arranged in order of digit value and in columns transversely of the length of the card, and a digit value may be registered in a given column of the card by punching a hole at the appropriate index point or by making thereat a surface record, such as an electro-conductive or photosensitive mark or producing a magnetized spot.

Since a high speed record card magazine normally delivers each card sideways in a direction at right angles to its length, it is an object of the present invention to provide for the direction of movement of the card, delivered sideways from the magazine, to be quickly changed as soon as possible after leaving the magazine, to an endwise movement into or towards a work station, where an operation, such as reading or punching, is performed.

Another object of the present invention is to provide means for changing the direction of movement of record cards, for use with first feeding means for delivering record cards sideways in free flight from a card feed magazine, said direction-changing means comprising an intermediate support for directly receiving record cards one by one from said magazine when delivered by said first feeding means, said intermediate support having associated therewith a baffle for arresting free flight of the fed card, and secondary feed means for delivering a record card endways from said support, that is, at right angles to its former direction of delivery, in a plane parallel to the plane thereof and synchronously with said sideways delivery from the magazine of the immediately following card.

The invention may also be considered as providing record card feeding means, including a feed magazine and incorporating a device for changing the direction of movement of said record cards.

In preferred arrangements means are provided for controlling the card during flight, such as by means of a roller freely revolubly mounted above the intermediate support and adapted to derive momentum from the card received from the magazine, the acquired kinetic energy being utilized for controlling the card to prevent its interference with a following card.

A further object of one form of the invention is to provide for the card issuing operation to be arrested after the delivery of each card from the secondary feed means, with which may be associated a work station, and to be re-started on a signal received from a source external to the apparatus.

More particularly this further object involves the use of a clutch for effecting the operation of the feed magazine and the secondary feed means, provision being made of means for disengaging the clutch at a predetermined point in the cycle of operation of the feed magazine and also of means, subject to external control, for effecting re-engagement of said clutch.

Figure 1:
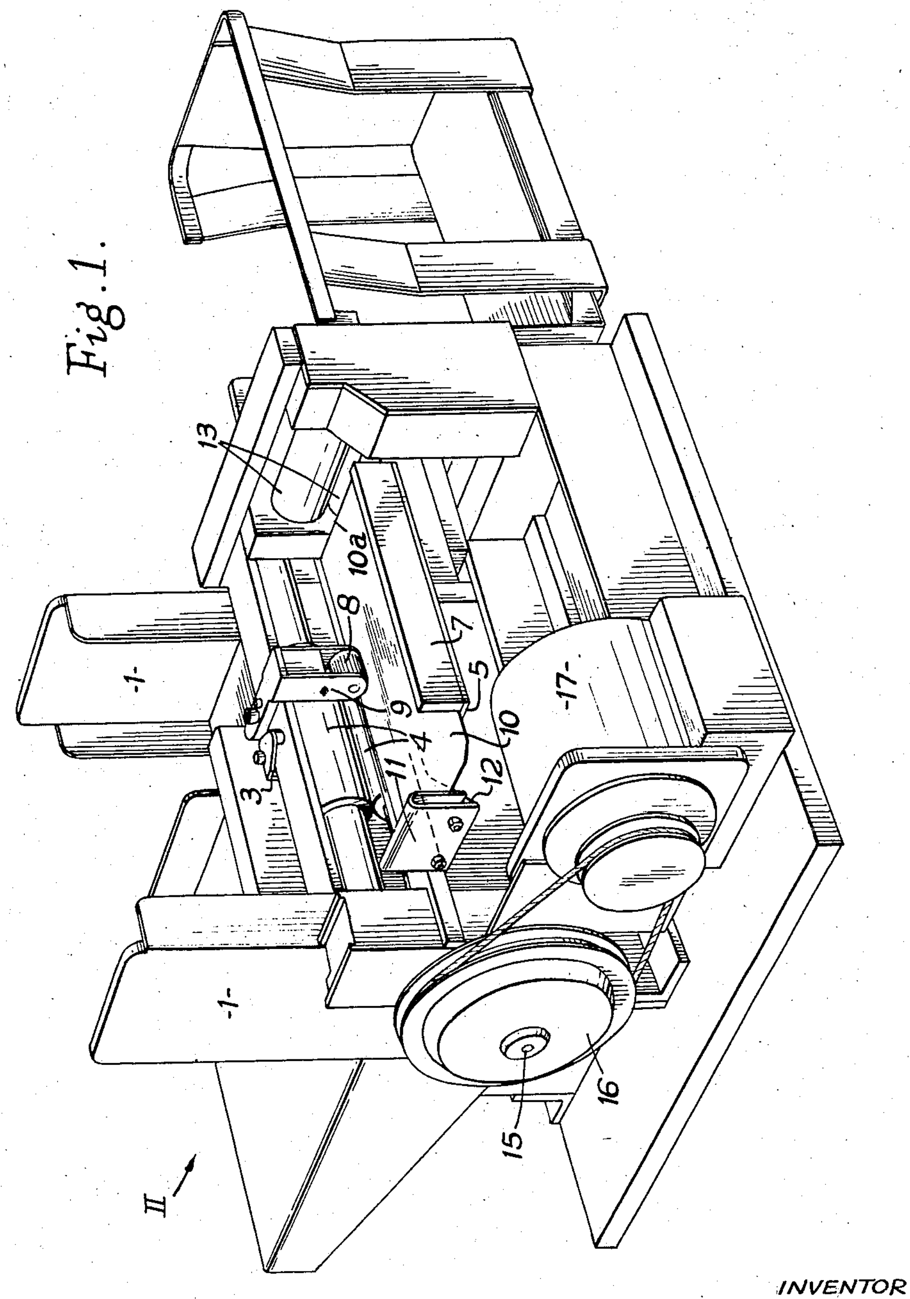
Figure 2:
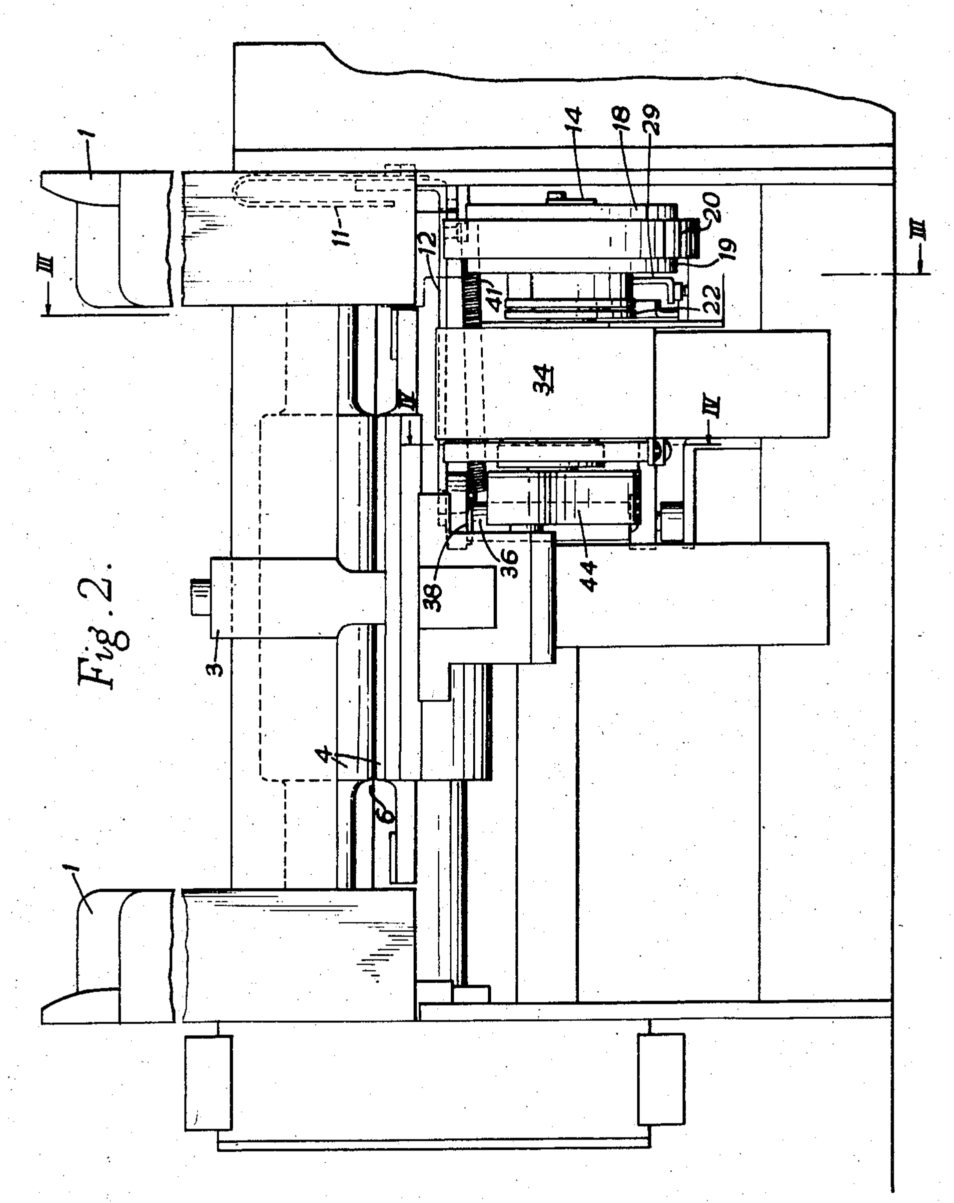
Figures 3, 4:
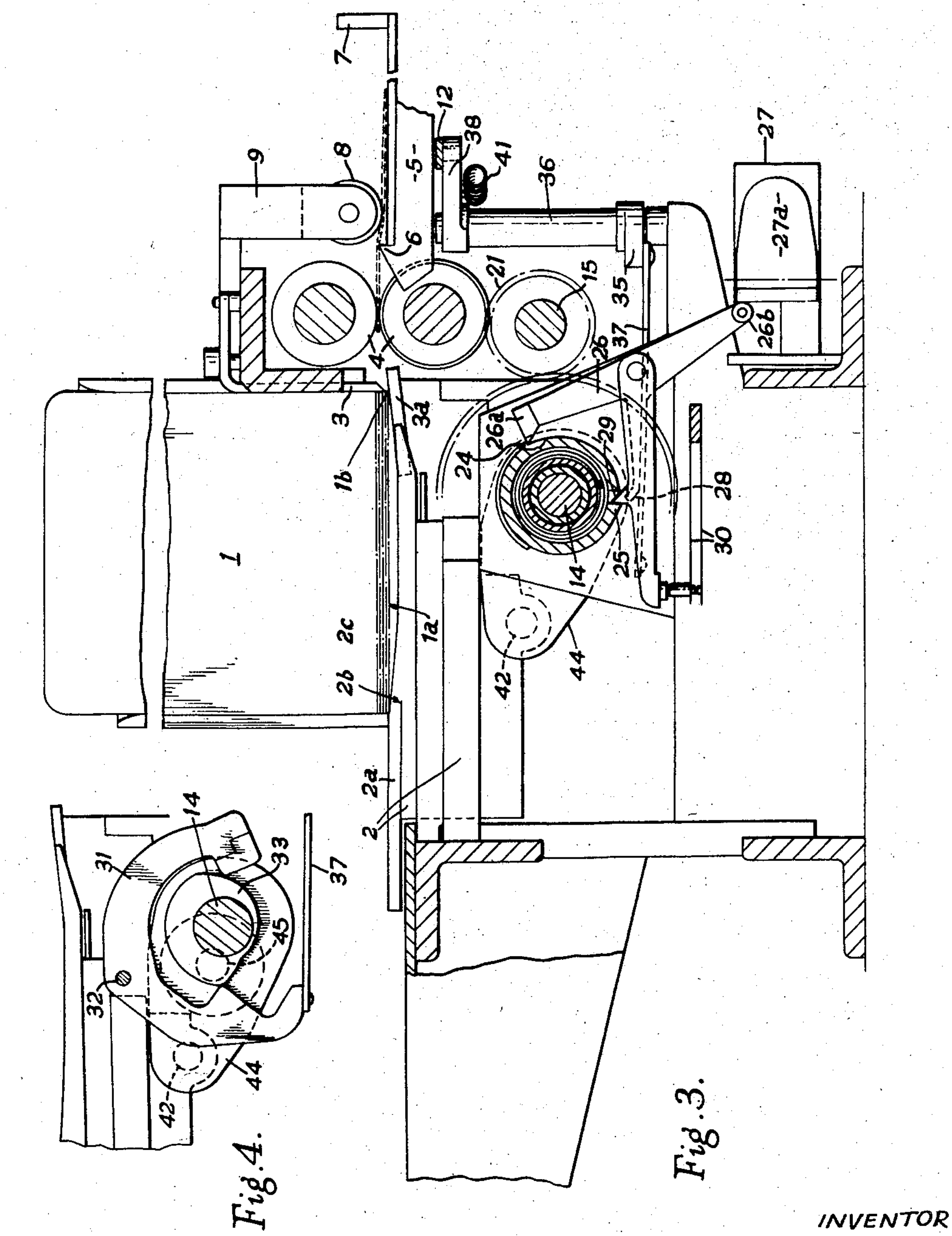
Figure 5:
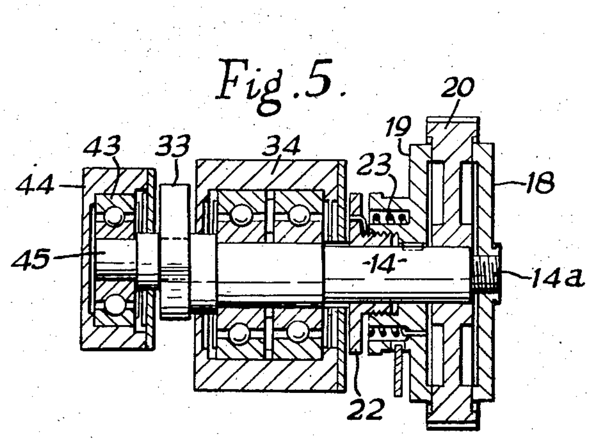
Figure 6:
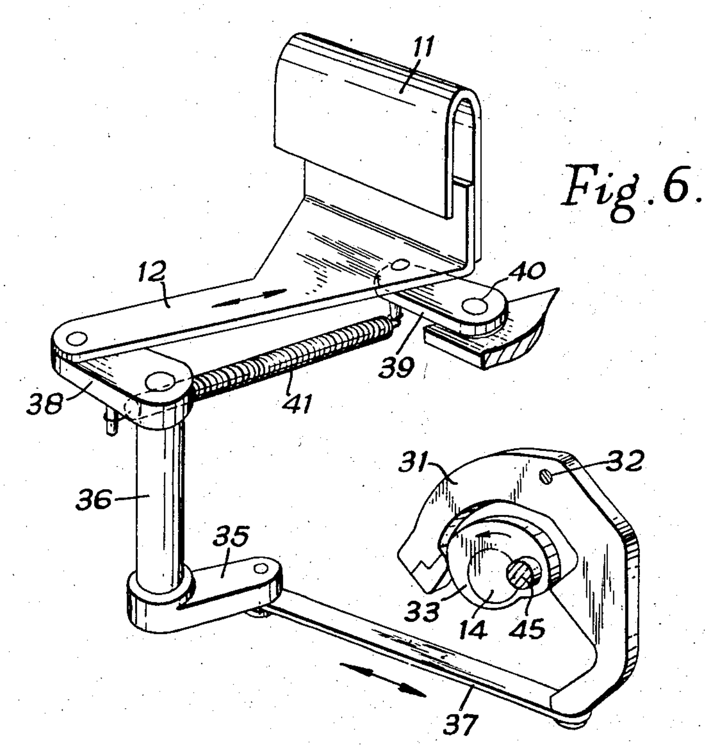

In order that the invention may be more readily understood reference will now be made to the accompanying drawings illustrative of an embodiment of the invention in the form of a record card direction-changing and feeding unit, shown applied to column by column reading of punched record cards. In the drawings, Figure 1 is a perspective view of the unit, Figure 2 is an elevation, looking in the direction of arrow II, Figure 1, Figure 3 is a cross section on line III—III of Figure 2, Figure 4 is a fragmentary section on line IV—IV of Figure 2, Figure 5 is a part sectional view through a clutch and associated components, and Figure 6 is a perspective view of mechanism for reciprocating the secondary card feed means.

In the embodiment illustrated, a magazine of known type is arranged with the cards stacked horizontally therein, and comprises the usual magazine walls 1, a reciprocating picker slide 2, a picker knife 2a elevated at its edge 2b to a height above the face 2c less than the thickness of a card, an adjustable throat gap, constituted between a fixed block 3a and a tongue 3 mounted alongside of the magazine said gap being adjustable to a dimension greater than the thickness of one card but less than that of two cards, and a pair of feed rolls 4. Behind the feed rolls 4 is arranged a platform 5 (the intermediate support previously referred to) at such a height as to support a card a little below the level at which it will be delivered from the feed rolls 4. The platform 5 has a shallow vertical lip 6 adjacent to the feed rolls 4 and a baffle 7 at a distance slightly more than the width of a card beyond said lip 6. Behind the lip 6 and at about half its height above the platform 5 is arranged the lowermost part of the periphery of a freely pivoted roller 8 mounted in a bracket 9 and having a diameter less than that of the feed rolls 4, to which it is axially parallel, substantially the whole of said roller 8 being disposed over the platform 5 behind the lip 6.

The position of the roller 8 in the direction of its axis is such as to retain depressed below the lip 6 the trailing corner of a card as it is being ejected endways from the platform 5 at a time when the next card from the magazine is about to pass over the lip 6.

The roller 8 has a somewhat spherical tread and is lightly knurled to ensure that it is set in motion by contact with a card emerging from the feed rolls 4, so that, by reason of its momentum, the roller 8 corrects any tendency of the card to rebound from the baffle 7 on reaching the latter, particularly if the card is so curled as otherwise to be capable of returning over the lip 6. The depression of the card by the roller 8 is effected without any frictional check of the movement of the card towards the baffle 7.

Disposed adjacent to one end of the platform 5 is a second vertical lip 11 just clear of the end of the card, designated 10 in Fig. 1 and shown lying on platform 5, as delivered sideways by the magazine feed rolls 4. This second lip 11 is carried on a feeder member 12 having a reciprocating movement, in the direction of the length of a card, which is sufficient to move the card 10 endways until its leading end 10a is engaged by a secondary pair of rolls 13 which serve to complete endways passage of the card 10, for instance, through a work station, such as a reading station comprising a series of photoelectric cells positioned adjacent to the secondary rolls and illuminated, when card perforations permit, by small lamps arranged above the card.

In the embodiment here described, the picker slide 2 associated with the card magazine and the feeder member 12 are driven from a clutch shaft 14 (Figs. 3 and 4) carrying a clutch by which said clutch shaft 14 may be connected to a main drive shaft 15, which also drives both sets of feed rolls, that is the magazine feed rolls 4 and the secondary feed rolls 13.

The main drive shaft 15 carries a belt pulley 16 (Fig. 1) by means of which the shaft 15 is drivingly connected to an electric motor 17. Rotation is imparted to the lower magazine feed roll by direct geared drive from drive shaft 15; the drive for the secondary feed rolls 13 is not shown but can be of any suitable form.

The clutch consists essentially of three members, the clutch discs 18, 19 (Figs. 2 and 5) and a central member, which in the present instance is a gear wheel 20 rotatable on the shaft. The disc 19 is keyed to the shaft but is slidable axially. The disc 18 is mounted on the screwed portion 14*a* of the shaft.

The disc 19 has a screwed attachment to the spigot of the flange 22. This flange is also elastically coupled to the disc 19 by the torsion spring 23. The nose 26*a* of the clutch pawl 26 engages the step 24 of the flange 22, to arrest and prevent its rotation. In the condition of rest the nose 26*a* also engages a similar step on the body of the disc 19, thus determining the position of the picker slide and feeder in this condition. Retrograde rotation of the disc 19 (with the shaft 14) is prevented by a check pawl 28 which engages a step 25 on the body of the disc 19, in the condition of rest.

In the condition of rest the torsion spring 23 is in the wound state and on the disengagement of the pawl nose 26*a* from the step 24 of the flange 22 the spring partially relaxes, rotating the flange and, by the consequent unscrewing movement of the connection to the disc 19, thrusts that disc against the wheel 20 and the latter against the disc 18. This disc being on a screw of appropriate hand tends to rotate slightly to advance itself axially against the wheel 20, thus producing a self-loading effect and preventing slip. A stop, which is not shown, in the shaft 14, limits the angular movement of the disc 18 about the shaft and a light annular torsion spring, between the shaft and the disc, serves to withdraw the disc 18 on its screw thread, when the pressure of the wheel 20 is removed, on the ultimate disengagement of the clutch.

This disengagement is effected by allowing the pawl nose 26*a* to re-engage the step 24 of the flange 22 and arrest its rotation, whereupon the energy of the rotating parts causes the disc 19 to wind up the torsion spring 23 and, by the screwed connection between the disc 19 and the flange 22, to withdraw the pressure of the disc 19 from the wheel 20, which can then rotate freely on the shaft 14.

The disengagement of the nose 26*a* of the pawl 26 is effected by the armature 27*a* of the magnet 27 displacing the small roller 26*b* shown on the lower end of the pawl 26, this action being due to an impulse received from an external source.

An auxiliary arm 28 on the pawl 26 serves to assist in the re-engagement of the pawl nose 26*a*, on being displaced by the step 24 of the flange 22 during its rotation.

The clutch is adapted to be engaged by the spring 23 or disengaged by the pawl 28 at that particular point in the operation cycle at which the picker slide 2 is just about to begin ejection of a record card from the magazine and the feeder member 12 is just about to initiate endways traverse from the platform 5 of a record card previously delivered by the magazine feed rolls. The movements of pawl 29 may be utilized for opening and closing switch contacts 30 in connection with a routine operation to be performed externally of the unit.

The picker slide 2 is reciprocated by the connecting rod 44 Figs. 2, 3, 4 and 5 coupling the crankpin 45, Fig. 5, to the crosshead pin 42 Figs. 3 and 4 on the picker slide 2 Fig. 3. When the slide 2 Fig. 2 moves towards the right of the figure, the edge 2*b* of the picker knife 2*a* engages the lowest card 1*a* of those in the magazine 1 and advances it through the gap between the throat knife 3 and the throat block 3*a* until it is gripped by the feed rolls 4 by which it is delivered to the platform 10. During this operation the card immediately above the card 1*a* is prevented by the throat knife 3 from accompanying the card 1*a*.

The mechanism for reciprocating the feeder member 12 is shown more particularly in Figure 6, and comprises a yoke-like feeder lever 31 rockable positively upon a fixed pivot 32 by a cam 33 mounted on the end of clutch shaft 14 remote from that carrying the clutch plate 18. The clutch shaft 14 is journalled in a suitable bearing 34. The rocking movements of lever 31 are transmitted to an arm 35 on a vertical rockable spindle 36 by a link 37 swivelly connected to said lever 31 and said arm 35. The spindle 36 carries a second arm 38 which is paired with a lever 39 of similar basic dimensions pivoted on a fixed pin 40, both the arm 38 and the lever 39 being connected to the feeder member 12 so as to impart reciprocation to said feeder member 12 in such a manner as to maintain lip 11 at right angles to the lip 6 (Figure 3). A tension spring 41 anchored at one end near the inner end of arm 38 and at the other end near the outer end of lever 39 assists the feeding movement of member 12, the return of which to its normal inoperative position is due to the cam 33.

The picker slide 2 is moved to and fro by being pivotally connected by a pin 42 journalled in a link plate 44 to which a reciprocatory movement is imparted by means of an eccentric pin 45 on the cam 33 journalled in a bearing 43 in the link plate 44.

In a modified arrangement (not shown) which is adapted to carry out the operation of column-by-column punching of a record card delivered to the platform by the magazine feed rolls, the secondary feed rolls may be driven intermittently and not continuously, as in the case of the magazine feed rolls. It may be desirable to provide also a clutch in the drive means for the punch and for the endways feeding of the cards. The column of punches employed would occupy a similar position to the reading means employed in the previously described embodiment.

What is claimed is:

1. Record card feeding means, adapted for changing the direction of movement of said record cards, comprising in combination, a feed magazine, primary feed means for delivering record cards sideways from said magazine, secondary feed means adjacent one end of said primary feed means and at right angles thereto, an intermediate support adapted to receive record cards delivered sideways by the primary feed means and having an abutment face for locating said cards for endways movement to be given by said secondary feed means, and means adapted to modify the flight of a record card delivered sideways from the magazine so to correct any tendency of the card to rebound from said abutment face alongside of said support.

2. Record card handling means as claimed in claim 1, characterised in that the record card flight controlling or modifying means comprises a freely revoluble roller mounted above said support and adapted to derive momentum from the card received from the magazine, the acquired kinetic energy being utilised for controlling the card to ensure that it settles on said support in correct location for endways feeding.

3. Record card feeding means, adapted for changing the direction of movement of said record cards, comprising in combination, a feed magazine having reciprocatory card feeding means, a pair of primary feed rolls receiving record cards from said magazine and delivering them in a sideways direction, a pair of secondary feed rolls adjacent an end of said pair of primary feed rolls and at right angles thereto, an intermediate support for receiving record cards delivered sideways by said primary feed rolls and having a raised lip along the side thereof adjacent said primary feed rolls and an abutment face along the opposite side thereof for locating on said support cards fed sideways thereonto, reciprocatory means for imparting endways movement to deliver a record card on said support into said secondary feed rolls, and a freely revoluble roller mounted just behind said lip above said support and adapted to derive momentum from a received card thereby to acquire kinetic energy reacting to settle the received card alongside said abutment face.

4. Record card feeding means as claimed in claim 3, characterised in that the roller is so positioned in relation to the lip as to ensure depression below said lip of the trailing corner of a card as it is being ejected endways from the support as the next card from the magazine is about to pass over the lip.

5. Record card feeding means as claimed in claim 4, wherein said secondary feed means comprises a reciprocating pusher adapted to impart to a card on the support an initial endways movement appreciably less than the length of the card and a pair of feed rolls adapted to engage the leading end of the card and to continue the initial endways movement to move the card completely from the support.

6. Record card feeding means comprising in combination, a feed magazine, primary feed means for delivering record cards sideways from said magazine, means for operating said primary feed means, secondary feed means adjacent and at right angles to one end of, and driven synchronously with, said primary feed means, an intermediate support adapted to receive and locate record cards delivered thereon sideways by said primary feed means for endways movement imparted by said secondary feed means, means for arresting the primary feed means and means for restarting the said primary feed means on receipt of a signal from an external source.

7. Record card handling means according to claim 6, including a clutch for effecting operation of the feed magazine and the secondary feed means and having means for disengaging the clutch at a predetermined point in the cycle of operation of the feed magazine, and means subject to external control for effecting re-engagement of said clutch.

References Cited in the file of this patent

UNITED STATES PATENTS 1,335,043 Cheshire ---------------- Mar. 30, 1920